United States Patent
Eikelenboom et al.

(10) Patent No.: US 6,922,405 B2
(45) Date of Patent: Jul. 26, 2005

(54) WIRELESS LAN WITH CARRIER SENSE THRESHOLD ADAPTION

(75) Inventors: Albert Eikelenboom, Utrecht (NL); Adriaan Kamerman, Nieuwegein (NL); Hendrik Moelard, Maarssen (NL); Leo Monteban, Nieuwegein (NL)

(73) Assignee: Agere Systems Inc., Allentown, PA (US)

( * ) Notice: Subject to any disclaimer, the term of this patent is extended or adjusted under 35 U.S.C. 154(b) by 864 days.

(21) Appl. No.: 09/817,474

(22) Filed: Mar. 26, 2001

(65) Prior Publication Data

US 2001/0028639 A1 Oct. 11, 2001

(51) Int. Cl.[7] .................................................. H04Q 7/24
(52) U.S. Cl. ...................................... 370/338; 370/455
(58) Field of Search ................................ 370/338, 401, 370/455, 331, 332; 455/450–452, 434, 41.2, 41.3, 67.11, 63.1, 63.3

(56) References Cited

U.S. PATENT DOCUMENTS

| | | | |
|---|---|---|---|
| 5,410,738 A | * 4/1995 | Diepstraten et al. | 455/528 |
| 5,717,688 A | 2/1998 | Belanger et al. | 370/331 |
| 5,946,631 A | 8/1999 | Melnik | 455/522 |
| 6,067,291 A | * 5/2000 | Kamerman et al. | 370/338 |

FOREIGN PATENT DOCUMENTS

| | | | |
|---|---|---|---|
| EP | 0589552 | 3/1994 | H04L/12/28 |
| EP | 0903891 | 3/1999 | H04L/12/28 |

OTHER PUBLICATIONS

Ad Kamerman et al. "WAVELAN–II: A High–Performance Wireless LAN for the Unlicensed Band" Bell Labs Technical Journal—Summer 1997 pp. 118–133.

* cited by examiner

Primary Examiner—Chau Nguyen
Assistant Examiner—Blanche Wong

(57) ABSTRACT

The present invention relates to a wireless local area network station comprising a signal processing element, a carrier detect sensing element, a defer behavior sensing element, and memory. The network station transmits and receives signals within a communication cell that defines a carrier detect zone and a defer zone around an access point. The network station associates with the access point by transmitting an association request to the access point and by receiving an association response from the access point during entry of the network station into the cell. The network station receives a preferred carrier detect threshold level value and a preferred defer behavior threshold level value from the access point and stores the carrier detect threshold and defer behavior threshold level values in its memory for use during operation while being associated with the access point.

12 Claims, 5 Drawing Sheets

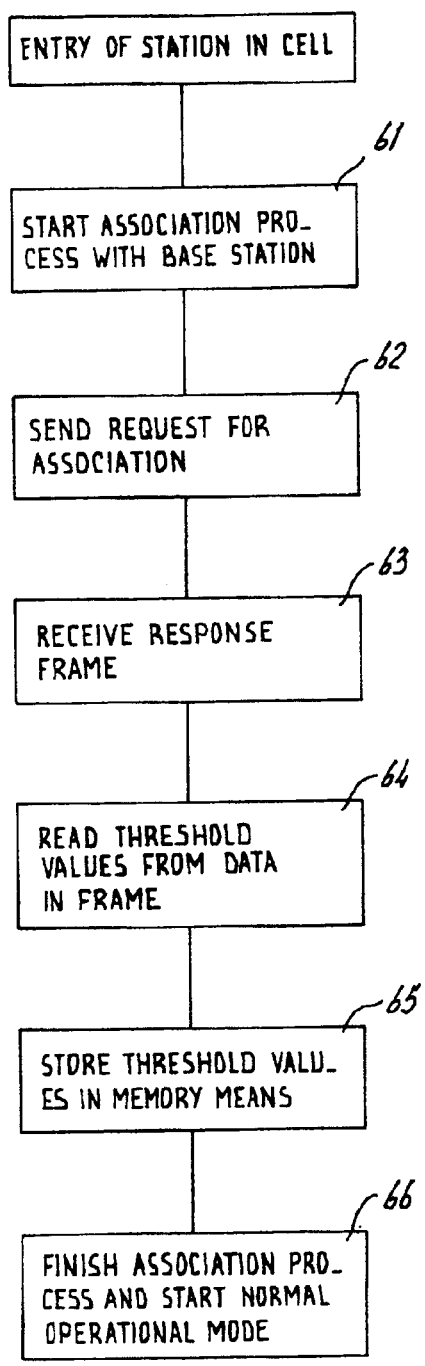
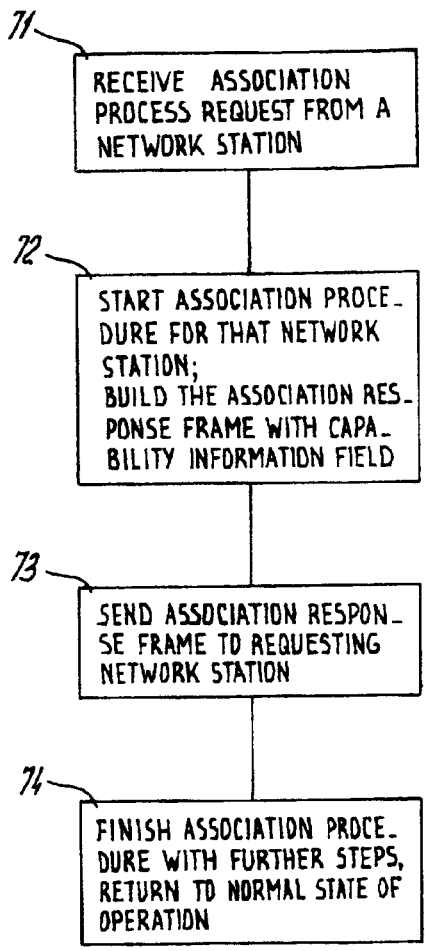

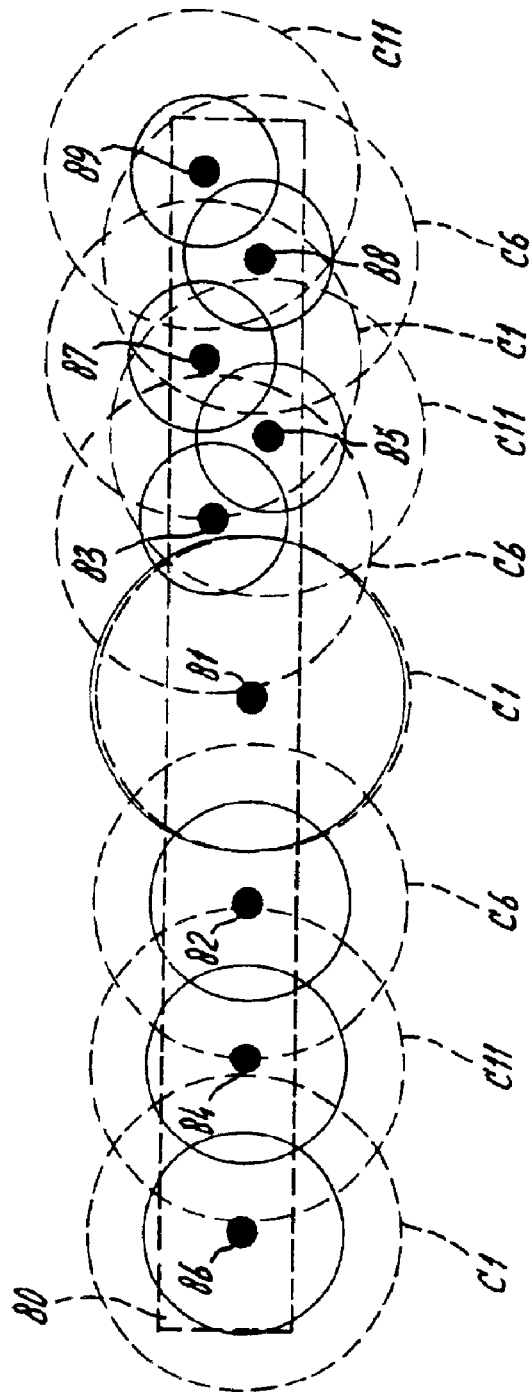

WIRELESS LAN WITH CARRIER SENSE THRESHOLD ADAPTION

CROSS-REFERENCE TO RELATED APPLICATION

This application claims priority of European Patent Application No. 00302533.5, which was filed on Mar. 28, 2000.

1. Field of the Invention

The invention relates to wireless data communication systems and more particularly to the utilization of an enhanced medium access control function by employing at least two signal level thresholds.

2. Description of the Related Art

Recently, wireless local area networks (LANs) have been developed as an enhanced replacement for wired LANs. In a wireless LAN for data-communication a plurality of (mobile) network stations (e.g., personal computers, telecommunication devices, etc.) are present that are capable of wireless communication. As compared to wired LANs, data-communication in a wireless LAN can be more versatile, due to the flexibility of the arrangement of network stations in the area covered by the LAN, and due to the absence of cabling connections.

Wireless LANs are generally implemented according to the standard as defined by the ISO/IEC 8802-11 international standard (IEEE 802.11). IEEE 802.11 describes a standard for wireless systems that will operate in the 2.4–2.5 GHz ISM (industrial, scientific and medical) band and, in particular, focuses on the MAC (medium access control) and PHY (physical layer) protocols for access point based networks and adhoc networks.

In access point based networks, (mobile) network stations within a group or cell can communicate only directly to an access point (base station). This access point acts as base station for the communication cell and forwards messages to the destination network station within the same cell or through a wired distribution system to another access point, from which such messages arrive finally at the destination network station. In ad-hoc networks, the network stations operate on a peer-to-peer level and there is no access point or wired distribution system.

Since multiple network stations within the cell operate at one single frequency channel within a large dynamic range of receive signal levels, collision of transmissions can occur easily. To avoid collisions to happen, network stations must check for datacommunication already in progress, before starting transmission themselves. The 802.11 basic medium access control scheme specifies data-communication of multiple network stations within a cell through the use of the CSMA/CA (carrier sense multiple access with collision avoidance) protocol. The 802.11 CSMA/CA protocol is designed to reduce the collision probability between multiple network stations accessing the medium simultaneously.

Wireless LANs based on CSMA/CA as described in IEEE 802.11 apply a carrier sense threshold to avoid collisions. For a given transmit power the level of the carrier sense threshold is defined by the range around an actively transmitting device. Inside this range the transmitting device will be received above the carrier sense threshold level by other devices. To avoid collisions, other devices are enforced by a listen-before-talk scheme, not to start transmissions while receiving a carrier signal above the threshold level.

In the IEEE 802.11 DSSS (direct sequence spread spectrum) specifications an additional defer behavior threshold level is defined. The defer behavior threshold level is related to the range within which other devices belonging to the same cell, are expected to be located. If a network station is receiving a transmission above the defer behavior threshold level, the network station is not allowed to transmit at that time, since a fellow cell member is apparently transmitting on the channel. If the reception level is below the defer behavior threshold level, the network station can assume the transmission is not related to the network cell (or at least, the transmission is not originated by a network station within the expected defer zone). Thus, the receiving station can ignore the transmission and start a transmission by itself. From U.S. Pat. No. 5,987,033 (column 6; lines 3–55) a more detailed description of carrier sense and defer behavior threshold levels in a CSMA/CA scheme is known.

In FIG. 1, known from EP-A-0903891, a schematic illustration of the relation between network cell size, network cell defer zone size and carrier detect threshold and defer behavior threshold levels is shown. In FIG. 1 the power level (Q) observed by a network station 3 when a corresponding access point 2 transmits a signal, is plotted as a function of distance (R). For a given carrier detect threshold level (drawn in the plot as a dotted horizontal line) the cell size of cell 14 is limited to a distance Rc from the access point 2, at which the power level crosses the given carrier detect threshold level. Ideally, a circle-shaped cell area around the access point 2 is thus defined. In the top of FIG. 1, the constructed area is shown, using the crossing of the power level curve with the carrier detect threshold level line as the cell limits. If, for example, a more sensitive level of the defer behavior threshold (i.e., lower than the carrier detect threshold level) is assumed, the defer distance in the cell can also be constructed. To determine a defer behavior threshold level for a given carrier detect threshold level, a network station 3 is assumed to be located at one side of the cell, e.g., at a distance −Rd from the access point 2. A curve corresponding to the transmit power level of a network station 3 as observed by other network stations is plotted as function of distance. The level at which the curve crosses the other side of the cell at distance +Rd defines the defer behavior threshold level as shown as a crossed horizontal line in FIG. 1. Conversely, the defer area 16 around an access point 2 for a given defer behavior threshold level, can be constructed as shown in FIG. 1 by the vertical dashed lines at distances −Rd and +Rd from the corresponding access point 2. By variation of the levels of the combined carrier detect threshold and defer behavior threshold, the size of the defer area 16 in relation to the cell size can be varied.

It is known from EP-A-0903891 that suitable setting of the levels of the defer behavior threshold and carrier sense detection threshold (for a cell including all its associated stations or, for stations individually) can enhance the medium access control scheme even further.

By the defer behavior of stations within a cell, a priority scheme for accessing the medium is developed. Network stations 3 within the defer zone 16 wait for each other's transmission to finish, before trying to start a transmission. Network stations within the cell range 14, but outside the defer zone 16, can access the-medium only at lower priority since network stations within the defer zone 16 are allowed to interrupt all transmissions received from outside the defer zone.

Depending on the combination of the two thresholds and their relative levels, the datacommunication characteristics of a network cell can thus be controlled varying from a large cell size with an equally large defer zone to a cell size in which a smaller defer zone is present. Also a defer zone larger than the cell size is possible, for example, to minimise collisions with transmissions from neighbouring cells at the same channel frequencies.

An installed network with access points 2 at fixed positions, may need smaller cells around some access points 2 to provide a high throughput density and, around other access points 2, larger cell sizes, because of a given limitation of the total number of access points 2 or, because of a lower density of network stations 3 in those cells. As known to those skilled in the art, smaller cells allow a more dense reuse of the same channel frequencies than larger cells. Moreover, the requirements for smaller cells on the isolation between different channel frequencies are less stringent than for large cells:

By using proper combinations of the carrier detect threshold level and the defer threshold level, a wireless LAN comprising a number of access points 2 and related network stations 3, can be optimised for the throughput requirements of individual network cells.

Configuration of the threshold values for all devices in a wireless LAN is a complex and often time-consuming operation. During the layout of the LAN, a number of access points 2 have been installed with proper carrier sense detect threshold level and defer behavior threshold level values in order to accommodate cells with desired size and characteristics. Within each cell all network stations 3 must preferably be installed with the same threshold values as the corresponding access point 2. For network stations 3 at fixed positions, a one-time installation procedure would be sufficient, although possibly lengthy and extensive.

However, the situation is more complicated, when mobile network stations 3 are used in the wireless LAN, where such a network station 3 can move from one cell to another cell, each of which may have different characteristics. This requires the (user of the) mobile network station 3 to change threshold levels to comply with the conditions inside the latter cell. Also, since the position of a network station 3 must be known in the network, a mobile network station 3 must initiate a disassociation process with the access point 2 of the cell the network station is leaving, and an association process with the access point 2 of the cell being entered.

A similar situation in which threshold level settings need (re)configuration (by a user or network administrator) occurs when relocating fixed network stations to other cells, and/or changing the layout of cells.

SUMMARY OF THE INVENTION

The present invention relates to an arrangement of a wireless local area network station which has signal processing means, carrier detect sensing means, defer behavior sensing means and memory and transmits and receives signals within a communication cell associated with an access point. The communication cell is associated with a carrier detect zone and a defer zone, and carries out an association process between the network station and the access point by transmitting an association request message to the access point and receiving an association response message from the access point during entry of the network station into the communication cell. The network station receives a preferred carrier detect threshold level value and preferred defer behavior threshold level value from the access point and stores the preferred carrier detect threshold level value and preferred defer behavior threshold level value in the memory of the network station for use during transmission and reception of signals while being associated with the access point.

BRIEF DESCRIPTION OF THE DRAWINGS

The features and advantages of the present invention will become more apparent from the detailed description set forth below when taken in conjunction with the drawings, which are intended for illustration purposes only and not to limit the scope of protection as defined in the accompanying claims.

FIG. 6 shows a flow diagram to illustrate the method of the present invention to configure in a network station the preferred carrier detect threshold level and defer behavior threshold level automatically upon association of that network station with the access point of a communication cell;

FIG. 7 shows a flow diagram to illustrate the method of the present invention for an access point to supply values of the preferred carrier detect threshold level and defer behavior threshold level to a network station, upon association of that network station with the access point; and FIG. 8 is an illustration of the effect on the network configuration, when using different defer behavior and carrier detect threshold levels in a building with access points configured for different cell sizes.

DESCRIPTION OF PREFERRED EMBODIMENT

Figure 1:
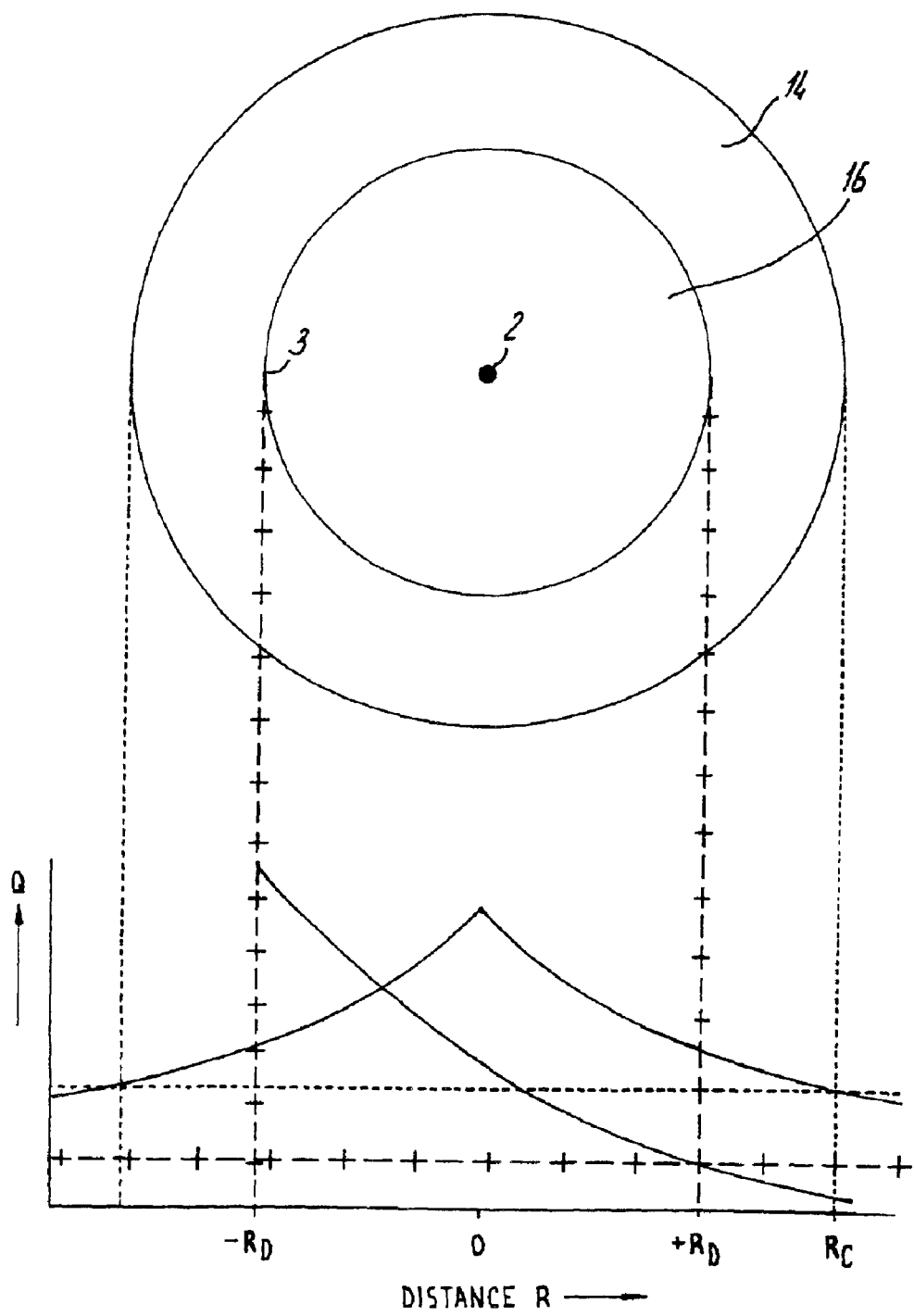
FIG. 1 schematically shows the relation between the overall network cell size, the network cell defer zone size, the carrier detect threshold level and the defer behavior threshold level as known from the prior art.
Figure 2:
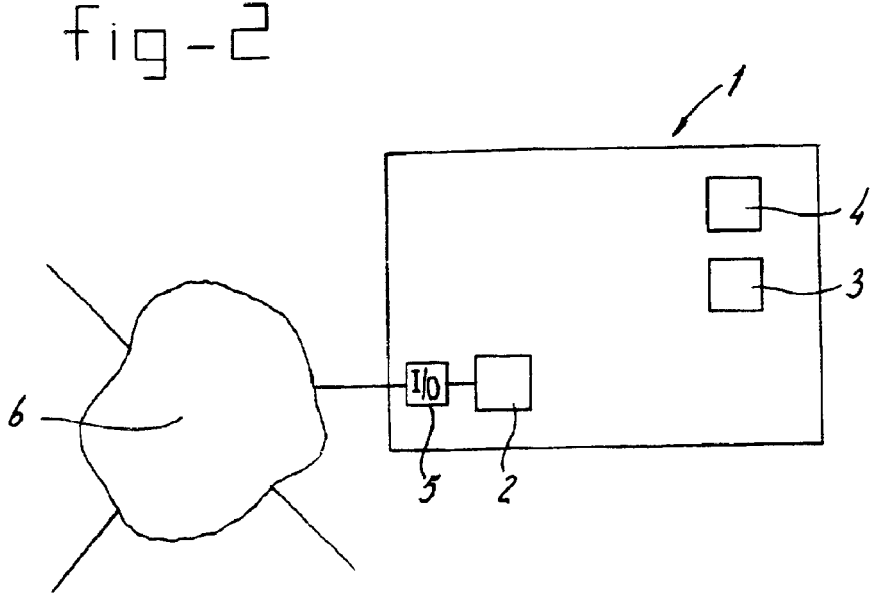
FIG. 2 shows a schematic overview of a communication cell in a wireless LAN comprising an access point and a plurality of network stations to illustrate the invention.

FIG. 2 shows a schematic overview of a wireless LAN 1 in which the invention is implemented. The wireless LAN 1 includes an access point 2 which serves as an access point, and a plurality of network stations 3, 4 of which two are shown. The access point 2 is connected via suitable I/O means 5 to a wired distribution network 6 for communication with other access points 2. It is to be understood that in LAN 1 the actual number of network stations 3, 4 may be 0 (zero) or more. The network stations 3, 4 may be mobile or at fixed positions: they all connect to the network 1 by means of wireless data-communication. In this embodiment of the invention the network stations 3, 4 are represented by personal computers, but it is to be understood that the network stations may be any type of telecommunication equipment that uses a wireless datacommunication network, such as mobile telephones, pagers, PDAs, laptop computers, etc.

Figure 3:
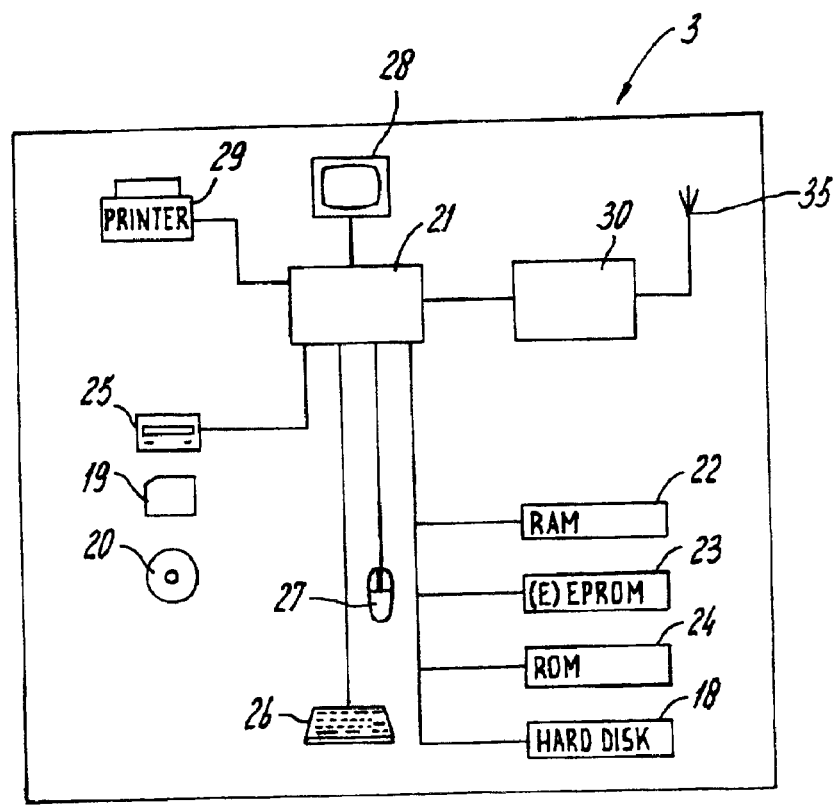
FIG. 3 shows a schematic block diagram of a network station of this invention.

FIG. 3 shows a schematic block diagram of an embodiment of a network station 3 comprising processor means 21 with peripherals. The processor means 21 is connected to memory units 18, 22, 23, 24 which store instructions and data, one or more reading units 25 (to read, e.g., floppy disks 19, CD ROM's 20, DVD's, etc.), a keyboard 26 and a mouse 27 as input devices, and as output devices, a monitor 28 and a printer 29. For data-communication over the wireless LAN 1, an interface card 30 is provided. The interface card 30 connects to an antenna 35.

The memory units shown comprise RAM 22, (E)EPROM 23, ROM 24 and hard disk 18. However, it should be understood that there may be provided more and/or other memory units known to persons skilled in the art. Moreover, one or more of them may be physically located remote from the processor means 21, if required. The processor means 21 are shown as one box, however, they may comprise several processing units functioning in parallel or controlled by one main processor, that may be located remote from one another, as is known to persons skilled in the art. Moreover, other input/output devices than those shown (i.e., 26, 27, 28, 29) may be provided.

In an alternative embodiment of the present invention, the network station 3 may be a telecommunication device in which the components of interface card 30 are incorporated as known to those skilled in the art.

Figure 4:
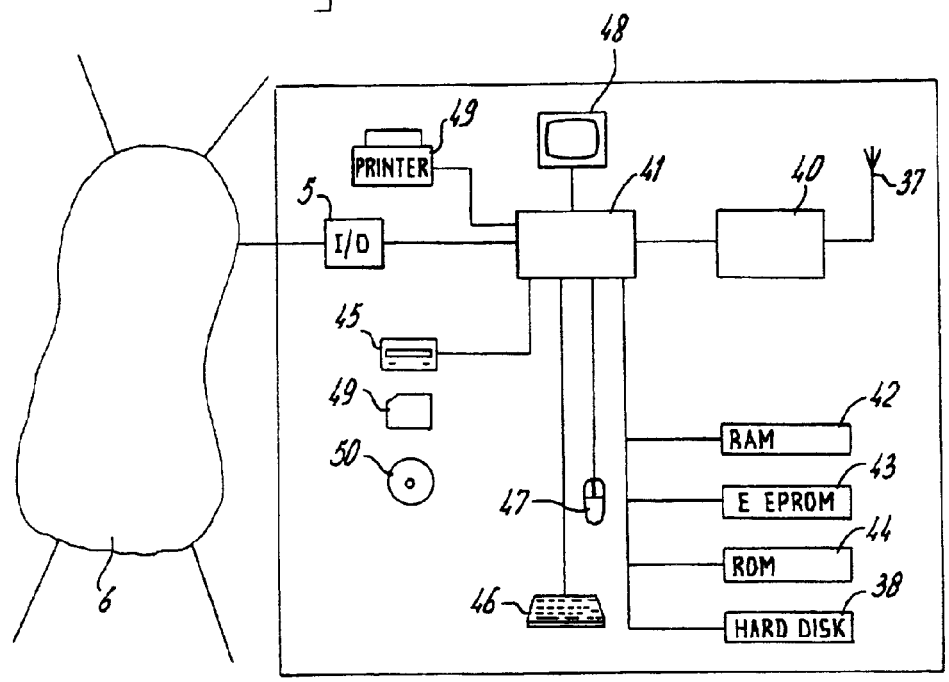
FIG. 4 shows a schematic block diagram of an access point of this invention.

FIG. 4 shows a schematic block diagram of an embodiment of an access point 2 comprising processor means 41 with peripherals. The processor means 41 is connected to memory units 38, 42, 43, 44 which store instructions and data, one or more reading units 45 (to read, e.g., floppy disks 49, CD ROM's 50, DVD's, etc.), a keyboard 46 and a mouse 47 as input devices, and as output devices, a monitor 48 and a printer 49. For datacommunication over the wireless LAN 1, an interface card 40 is provided. The interface card is connected to an antenna 37. The processor means 41 is connected via I/O means 5 to the wired distribution network 6 for communication with other access points 2.

The memory units shown comprise RAM 42, (E)EPROM 43, ROM 44 and hard disk 38. However, it should be understood that there may be provided more and/or other memory units known to persons skilled in the art. Moreover, one or more of them may be physically located remote from the processor means 41, if required. The processor means 41 are shown as one box, however, they may comprise several processing units functioning in parallel or controlled by one main processor, that may be located remote from one another, as is known to persons skilled in the art. Moreover, other input/output devices than those shown (i.e., 46, 47, 48, 49) may be provided.

Figure 5A:
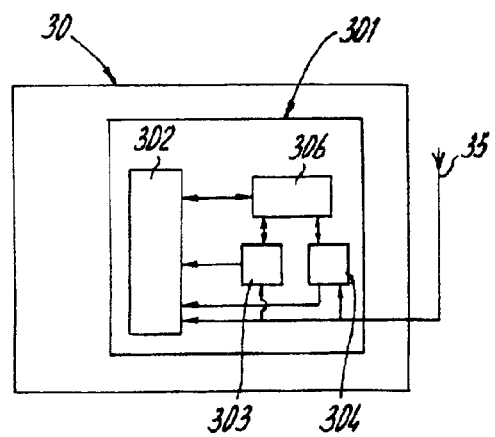
FIGS. 5a and 5b show schematic examples of wireless LAN interfaces for medium access controller devices depicting a carrier detect threshold level reception circuit and defer behavior threshold level reception circuit as described in this invention for use in a network station and an access point, respectively.

FIG. 5a shows a block diagram of the arrangement of the present invention for a medium access controller (MAC) device 301 on a wireless LAN interface card 30 installed in a network station 3, 4. Here, the MAC device 301 is schematically depicted, showing only a signal processing unit 302, a carrier detect level reception circuit 303 and a defer level reception circuit 304, antenna 35 and a on-board memory 306 as needed for the description of this embodiment of the invention. The MAC device 301 may comprise other components not shown here. Also, the components 302, 303, 304 which are shown, may be separate devices or integrated into one device. The devices also may be implemented in the form of analog or digital circuits. The on-board memory 306 may comprise RAM, ROM, FlashROM or other types of memory devices, as are known in the art.

Moreover, signal processing unit 302 and processor means 21 may be integrated in a single processor unit, as is known in the art.

Figure 5B:
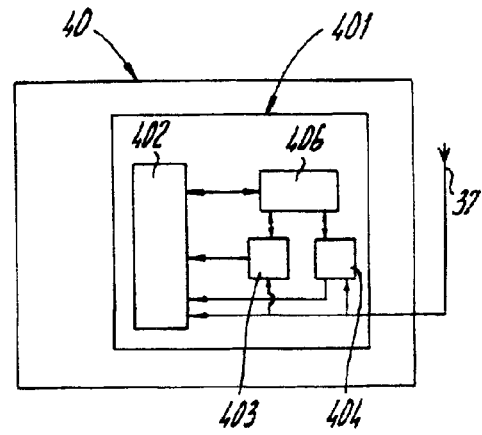

FIG. 5b shows a block diagram of the arrangement of the present invention for a medium access controller (MAC) device 401 on a wireless LAN interface card 40 installed in an access point 2. This LAN interface card 40 may be similar to LAN interface card 30, but it is to be understood that functionality and configuration of LAN interface card 40 can differ from those of LAN interface card 30. Here, the MAC device 401 is schematically depicted, showing only a signal processing unit 402, a carrier detect level reception circuit 403 and a defer level reception circuit 404, antenna 37 and a on-board memory 406 as needed for the description of this embodiment of the invention. The MAC device 401 may comprise other components not shown here. Also, the components 402, 403, 404 which are shown, may be separate devices or integrated into one device. The devices also may be implemented in the form of analog or digital circuits. The on-board memory 406 may comprise RAM, ROM, FlashROM or other types of memory devices, as are known in the art.

Moreover, signal processing unit 402 and processor means 41 may be integrated in a single processor unit, as is known in the art.

The configuration of the carrier detect threshold level and defer behavior threshold level of the MAC device 301 of network stations 3, 4 takes place when network stations get associated with access point 2. During the association stage, described by IEEE 802.11 as a distribution system service, the method of this invention provides a (re)configuration step. The signal processing unit 302 of network station 3, 4 transmits a request for association to the access point 2. In the association response frame the access point 2 sends the preferred (and predetermined) values of carrier detect threshold level and defer behavior threshold level to the requesting network station 3, 4. The MAC device 301 of network station 3, 4 receives the association response frame, from which the signal processing unit 302 extracts the values for the carrier detect threshold level and the defer behavior threshold level. Using the arrangement as shown in FIG. 5, the signal processing unit 302 stores the received values as preference values in memory 306.

It is to be understood that, if needed, other data from the association response frame can also be processed by the signal processing unit 302 at this stage.

After configuration, the MAC device 301 of station 3, 4 is now able to use these preferred values in transmissions while associated with access point 2, and enters in normal operation mode. Because of the listen-before-talk scheme applied in wireless data-communications as described in IEEE 802.11, the MAC device 301 constantly monitors through antenna 35 for the presence of transmission signals on the network 1. The strength of received signals is determined by the carrier detect threshold level reception circuit 303 and the defer behavior threshold level reception circuit 304. After comparing these values with the preferred carrier detect threshold level and the preferred defer behavior threshold level that are stored in memory 306, the circuits 303 and 304 send a carrier detect indication signal and a defer indication signal, respectively, to the signal processing unit 302 which determines on basis of the (combination of the) latter two signals whether transmission by the network station 3, 4 is allowed.

FIG. 6 shows a flow diagram to illustrate the method of the present invention to configure in a network station the preferred carrier detect threshold level and defer behavior threshold level automatically upon association of that network station with the access point of a communication cell. In the block diagram only the steps related to the present invention are shown. Other steps may be present in the association process, as are known in the art.

When a network station 3, 4 enters a communication cell, it has to announce its presence in the cell to be known in the network (known as the association process). In step 61 of the block diagram, the network station 3, 4, starts the association process. In step 62, the MAC device 301 of network station 3, 4 sends a request for association to the access point 2 of the cell. In this request the network station 3, 4 sends a message which contains a number of codes among which the code for association and the network station's identification number, as is known to those skilled in the art.

Next, in step 63, the MAC device 301 of network station 3, 4 receives a message from the access point of the cell. This message is known as the association response frame. In this frame, space is reserved for a number of codes which are to be processed by the signal processing unit 302 of the MAC device 301. In the present invention one of these codes is defined as the capability information field, in which the preferred values of the carrier detect threshold level and defer behavior threshold level for the communication cell are stored.

In step 64, the signal processing unit 302 of the MAC device 301 processes the codes in the association response frame.

In step 65, the data contained in the capability information field, is extracted and stored in memory means 306 of the MAC device 301 at positions for use as preferred values for the carrier detect threshold level and defer behavior threshold level.

In step 66, the MAC device finishes the association process and starts the normal operation mode.

Computer software based on the method illustrated in FIG. 6, to carry out the method as described in FIG. 6, is present in the processing means of network station 3, 4, for instance, after being loaded from a data carrier such as a CD. The software may also have been downloaded from the network 1, from read-only memory (ROM), or in any other way as known to those skilled in the art.

FIG. 7 shows a block diagram to illustrate the method of the present invention for an access point 2 to supply values of the preferred carrier detect threshold level and defer behavior threshold level to a network station 3, 4, upon association of that network station 3, 4 with access point 2.

In step 71 during operation, the access point 2 receives an association request from a network station 3, 4 to become associated with the cell corresponding to the access point 2.

In step 72, the access point 2 starts the association procedure. The association response frame containing the capability information field with the preferred values for the carrier detect threshold level and defer behavior threshold level is built. These values for the threshold levels are derived from the settings, that the access point uses to define the overall cell size 14 and the defer zone size 16 of the cell.

In step 73, the access point 2 sends the association response frame to the requesting network station 3, 4.

In step 74, the access point 2 finishes the association process and returns to its normal state of operation.

Computer software based on the method illustrated in FIG. 7, to carry out the method as described in FIG. 7, is present in the processing means of access point 2, for instance, after being loaded from a data carrier such as a CD. However, the software may also have been downloaded from the network 1, from read-only memory (ROM), or in any other way as known to those skilled in the art.

It is to be understood that this embodiment of the present invention still allows the MAC device 301 to act in accordance with IEEE 802.11. When, due to changes in reception signal strength, the preferred values of carrier detect threshold level and defer behavior threshold level do not yield proper reception of an associated access point 2, the MAC device 301 of a network station 3, 4 can associate with another access point, which is received at a higher signal level.

Also in accordance with IEEE 802.11, the association with another access point, requires a disassociation step with access point 2, followed by an association step with that other access point, in which, again according to this invention, the MAC device 301 of network station 3, 4 receives the preferred carrier detect threshold level and defer behavior threshold level values from that other access point.

If, however, another access point is not noticed by the MAC device 301, the MAC device 301 will attempt to remain associated with the former access point 2 by changing the stored carrier detect threshold level and defer behavior threshold level values to more sensitive levels. In this manner, the network station 3, 4 will be able to remain connected to that particular access point 2 over a larger range.

The option to change the sensitivity of the carrier detect threshold level and defer behavior threshold level is done independently of the preferred values distributed by access point 2, and is done automatically by the network station 3, 4 using the method of the present invention.

As illustrated by FIG. 8, the present invention can be advantageously applied in a wireless LAN with a plurality of access points. Due to requirements of cell size and traffic density (data throughput), a network with different cell sizes can be configured (e.g., by following planning guidelines like available from webpages http://www.wavelan.com/support/doclib/ by selecting Technical Bulletins on Channel management and Site Verification). In this way, the network is optimised for the intended data-communication requirements. Nine access points 81, 82, 83, 84, 85, 86, 87, 88, 89, depicted as solid dots, have been installed in a building 80 using IEEE 802.11 DSSS channels 1, 6, 11 (2412 MHz, 2437 MHz and 2462 MHz with 25 MHz spacing, denoted respectively by c 1, c6 and c 11) in the following way: in the middle of the building (e.g., the entrance) an access point 81 is operating at channel c1. Left and right from access point 81, access points 82, 83 use channel c6, more to the left and right access points 84, 85 use channel c 11. On the leftmost of the building the final access point 86 uses channel c 1, just as access point 87 on the right. Further on the right wing of the building, access point 88 uses channel c6 and access point 89 channel c 11. The solid inner circles depict the defer zone sizes, within which defer behavior should be followed. The outer dashed circles depict the cell size defined by the carrier detect threshold level of an access point.

A mobile network station 3, 4 entering in the middle of the building, will associate with access point 81 using low thresholds (as depicted by the wide ranges for defer zone size and cell size). While moving to the left, the network station 3, 4 disassociates from access point 81 due to decrease of the reception level strength, and associates with access point 82 with a higher reception level strength. During association with access point 82, the network station automatically reconfigures its carrier detect threshold level and defer behavior threshold level to comply with the settings of access point 82 by using the arrangement and method of the present invention. Similar reconfigurations will occur when the network station moves even further to the left, or when the network station moves to the right wing of the building where cell sizes are smallest. It is clear that automatic configuration of threshold levels contributes considerably to a free (and carefree) movement of the network station in the network, without the need for manual (re) configuration.

In one embodiment, the invention also enhances the robustness of the datacommunication between network stations and access points. This is accomplished in the following way: the access point 2 uses more sensitive threshold levels than the predetermined configuration levels that are transmitted to stations 3, 4 that associate with the access point. Because the network station 3, 4 automatically configures with new threshold levels after the association step, it starts using higher thresholds (less sensitive) than the access point 2. Thus, the network station 3, 4 can anticipate earlier (i.e., at a higher signal reception level) to switch to another access point when moving in the cell. In case, the network station does not notice another access point at a higher reception level while it is no longer able to receive its current access point above the carrier detect threshold, the network station will automatically adapt its settings to lower thresholds (more sensitive) to continue reception of the access point 2 which the network station was already associated with. In this way the network station 3, 4 is able to stay connected with an access point 2 over a larger range. It is to be noted that since in this embodiment, the access point 2 already uses more sensitive threshold levels, the cell size as related to the access point 2 is always larger than the initial configured size for network stations, allowing network stations to keep associated at more sensitive threshold levels, when no other receivable access point is within range.

Of course, by the procedure of setting more sensitive threshold levels a network station 3, 4 gets a lower priority within the group of other network stations associated with the access point 2, because the other network stations are using still higher thresholds (less sensitive) and they will not defer for such a further away network station 3, 4 received below their defer threshold. Therefore, such a case gives the best compromise of optimum medium reuse (by less deferring of other network stations and access point 2) and robust connectivity with respect to the further away network station 3. 4 (although with lower medium access priority).

In this latter embodiment, the network station 3, 4 is also capable of increasing the threshold levels again to obtain the preferred threshold level values.

The lowest limits of the threshold values are determined by the sensitivity of the electronic circuits used, both in the network stations 3, 4 and the access points 2, 81–89, as is evident to persons skilled in the art.

It is observed that the capacity of network stations 3, 4 to automatically amend their threshold levels as explained above, is not restricted to cases where they receive preferred threshold level values from the access point 2, 81–89 upon entry into a communication cell.

This potential feature may also be employed in those situations where network stations 3, 4 start with preferred threshold level values which are not received from the access point 2, 81–89, but which are obtained from memory 306 as default values.

What is claimed is:

1. A wireless local area network station comprising signal processing mean, carrier detect sensing means, defer behavior sensing means and memory, the network station comprising:
    means including at least the signal processing means for transmitting and receiving signals within a communication cell associated with an access point, the communication cell being associated with a carrier detect zone and a defer zone;
    means, including the signal processing means, the carrier detect sensing means, and the defer behavior sensing means, for carrying out an association process between the network station and the access point by transmitting an association request message to the access point and receiving an association response message from the access point during entry of said network station into said communication cell, the network station being coupled to the access point to receive a preferred carrier detect threshold level value and preferred defer behavior threshold level value;
    and memory for storing the preferred carrier detect threshold level value and the preferred defer behavior threshold level value for use during transmission and reception of signals while being associated with the access point.

2. The wireless local area network station defined in claim 1, wherein the preferred carrier detect threshold level value and preferred defer behavior threshold level value are received as part of the association response message.

3. The wireless local area network station defined in claim 1, wherein the preferred carrier detect threshold level value and preferred defer behavior threshold level value are received after the association response message.

4. The wireless local area network station defined in claim 3, wherein the network station is arranged to vary said preferred carrier threshold level value and the preferred defer behavior threshold level value after having stored them.

5. The wireless local area network station defined in claim 4, wherein the network station is arranged to disassociate from the access point and associate with another access point.

6. A wireless local area network access point comprising signal processing means and a memory, the access point being adapted to:
    transmit and receive signals within a communication cell associated with the access point and with a carrier detect zone and a defer zone to
    carry out an association process between the access point and a network station by transmitting an association response message to the network station in reply to receipt of an association request message from the network station during entry of the network station into the communication cell, the access point is coupled to the memory to
    read a preferred carrier detect threshold level value and preferred defer behavior threshold level value after having received the association request message, and to transmit to the network station the preferred carrier detect threshold level value and preferred defer behavior threshold level value.

7. An access point of claim 6, further comprising carrier detect sensing means and defer behavior sensing means, where the memory is coupled to store an access point carrier detect threshold level value and access point defer behavior threshold level value for use by the access point during communicating with a network station and that is lower than the preferred carrier detect threshold level value and preferred defer behavior threshold level value.

8. A method of communicating by a wireless local area network station comprising the steps of:
    transmitting and receiving signals within a communication cell associated with an access point, the communication cell being associated with a carrier detect zone and a defer zone;

carrying out an association process between the network station and the access point by transmitting an association request message to the access point and receiving an association response message from the access point during entry of the network station into said communication cell;

receiving a preferred carrier detect threshold level value and preferred defer behavior threshold level value from the access point; and storing the preferred carrier detect threshold level value and preferred defer behavior threshold level value in the memory of the network station for use during transmission and reception of signals while being associated with the access point.

9. A method of operating a wireless local area network station comprising the steps of:

transmitting and receiving signals within a communication cell associated with an access point, the communication cell being associated with a carrier detect zone and a defer zone;

carrying out an association process between the network station and the access point by transmitting an association request message to the access point and receiving an association response message from the access point during entry of the network station into the communication cell;

receiving a preferred carrier detect threshold level value and preferred defer behavior threshold level value from said access point; and storing said preferred carrier detect threshold level value and preferred defer behavior threshold level value in the memory of the network station for use during transmission and reception of signals while being associated with the access point.

10. A method of communicating by a wireless local access network access point comprising the steps of:

transmitting and receiving signals within a communication cell associated with the access point, the communication cell being associated with a carrier detect zone and a defer zone;

carrying out an association process between the access point and a network station by transmitting an association response message to the network station in reply to receiving an association request message from the network station during entry of said network station into the communication cell;

reading a preferred carrier detect threshold level value and preferred defer behavior threshold level value from the memory after having received the association request message; and transmitting the preferred carrier detect threshold level value and preferred defer behavior threshold level value to the network station.

11. A method of operating a wireless local access network access point comprising the steps of:

transmitting and receiving signals within a communication cell associated with the access point, the communication cell being associated with a carrier detect zone and a defer zone;

carrying out an association process between the access point and a network station by transmitting an association response message to the network station in reply to receiving an association request message from the network station during entry of said network station into said communication cell;

reading a preferred carrier detect threshold level value and preferred defer behavior threshold level value from the memory after having received the association request message; and transmitting the preferred carrier detect threshold level value and preferred defer behavior threshold level value to the network station.

12. A wireless local area network station comprising signal processing means, carrier detect sensing means, defer behavior sensing means and a memory for storing a carrier detect threshold level value and a defer behavior threshold level value for use during transmission and reception of signals while being associated with an access point, the network station comprising:

means including at least the signal processing means for transmitting and receiving signals within a communication cell associated with the access point, the communication cell also associated with a carrier detect zone and a defer zone; and means, including the signal processing means, the carrier detect sensing means, and the defer behavior means for carrying out an association process with the access point by transmitting an association request message to the access point and receiving an association response message from the access point during entry of said network station into said communication cell;

the network station being coupled to the access point to receive at least one of said carrier detect threshold level value and said defer behavior threshold level value during operation.

* * * * *